Oct. 17, 1939.  H. F. FLOWERS  2,176,172
VEHICLE BOGIE
Filed July 20, 1936  3 Sheets-Sheet 1

Inventor
Henry Fort Flowers
By Mason & Porter
Attorneys

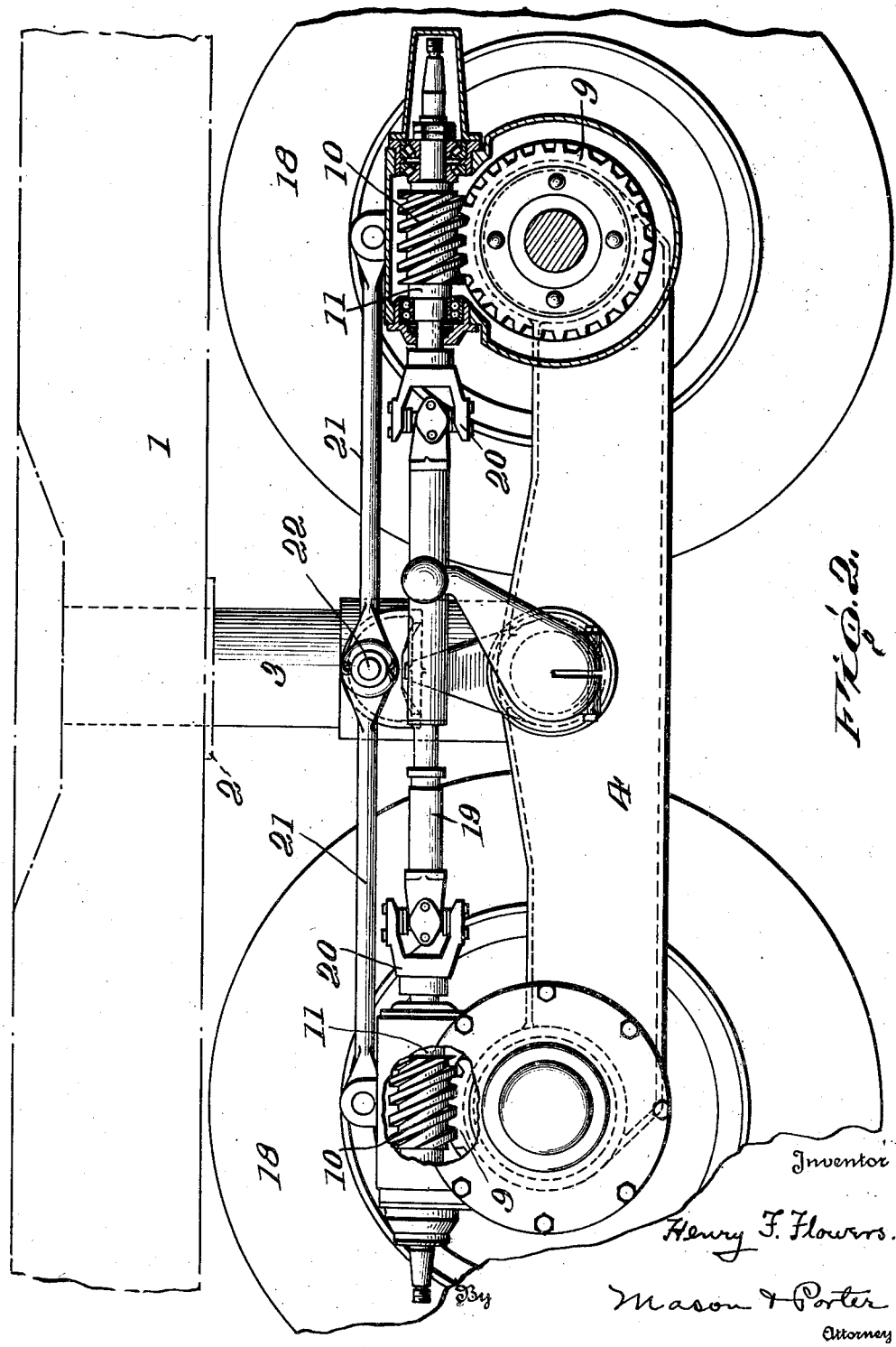

Oct. 17, 1939.   H. F. FLOWERS   2,176,172
VEHICLE BOGIE
Filed July 20, 1936   3 Sheets-Sheet 3
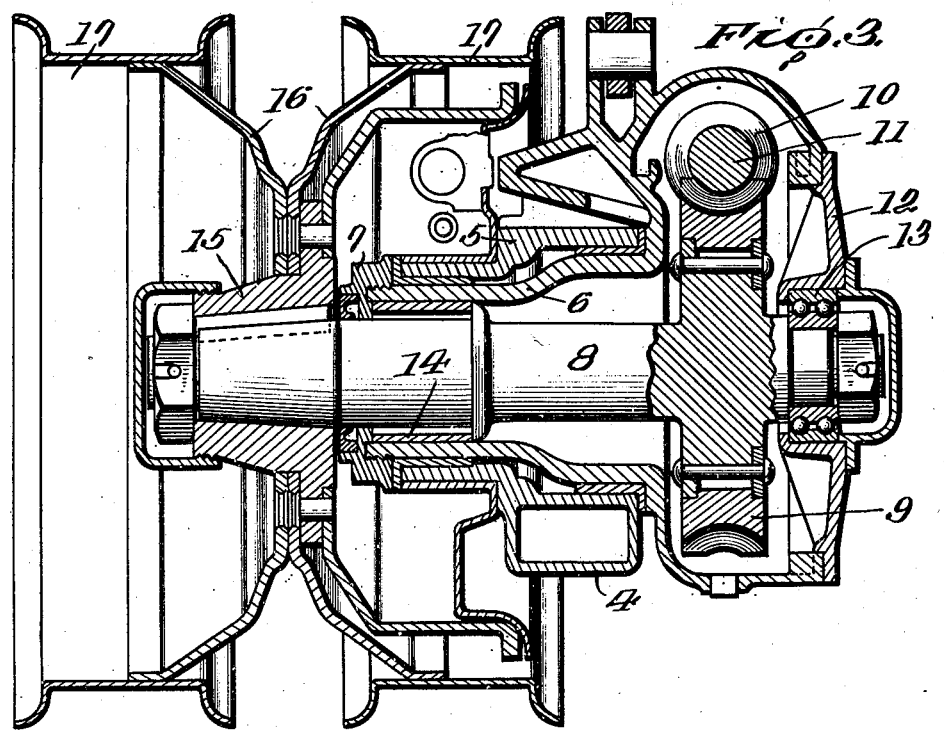
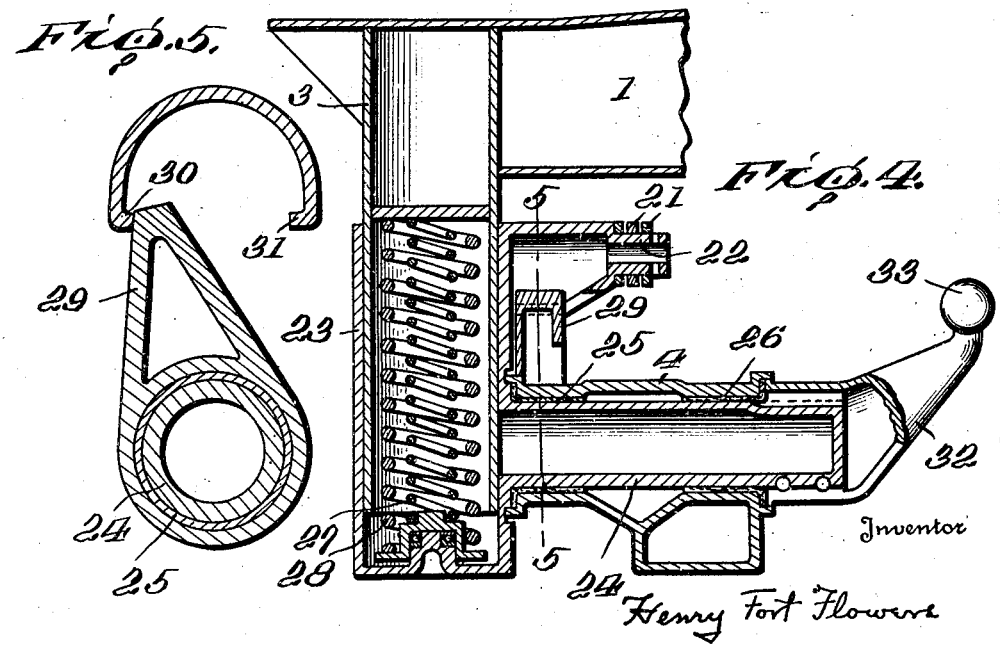
Inventor
Henry Fort Flowers
By Mason Porter
Attorneys Patented Oct. 17, 1939

2,176,172

UNITED STATES PATENT OFFICE 2,176,172

VEHICLE BOGIE

Henry Fort Flowers, Findlay, Ohio

Application July 20, 1936, Serial No. 91,591

2 Claims. (Cl. 280—124)

The invention relates to new and useful improvements in vehicles and more particularly to the bogie and the mounting for the body and the wheels thereon.

An object of the invention is to provide a bogie wherein the wheels are located on the same side of the bogie so that the vertical axis about which the bogie turns lies substantially in the plane of rotation of the wheels.

A further object of the invention is to provide a vehicle bogie of the above type wherein the body supporting member is provided with a laterally projecting gimbal support on which the bogie frame is mounted for oscillation in a vertical plane.

In the drawings—

Fig. 2 is a view partly in side elevation and partly in section of the improved bogie and showing in broken lines a portion of the supporting frame of the vehicle body;

Fig. 3 is a vertical sectional view through the bogie frame at one of the wheel supports;

Fig. 4 is a vertical sectional view through the bogie frame at the body support, and Fig. 5 is a sectional view on the line 5—5 of Fig. 4.

Figure 1:
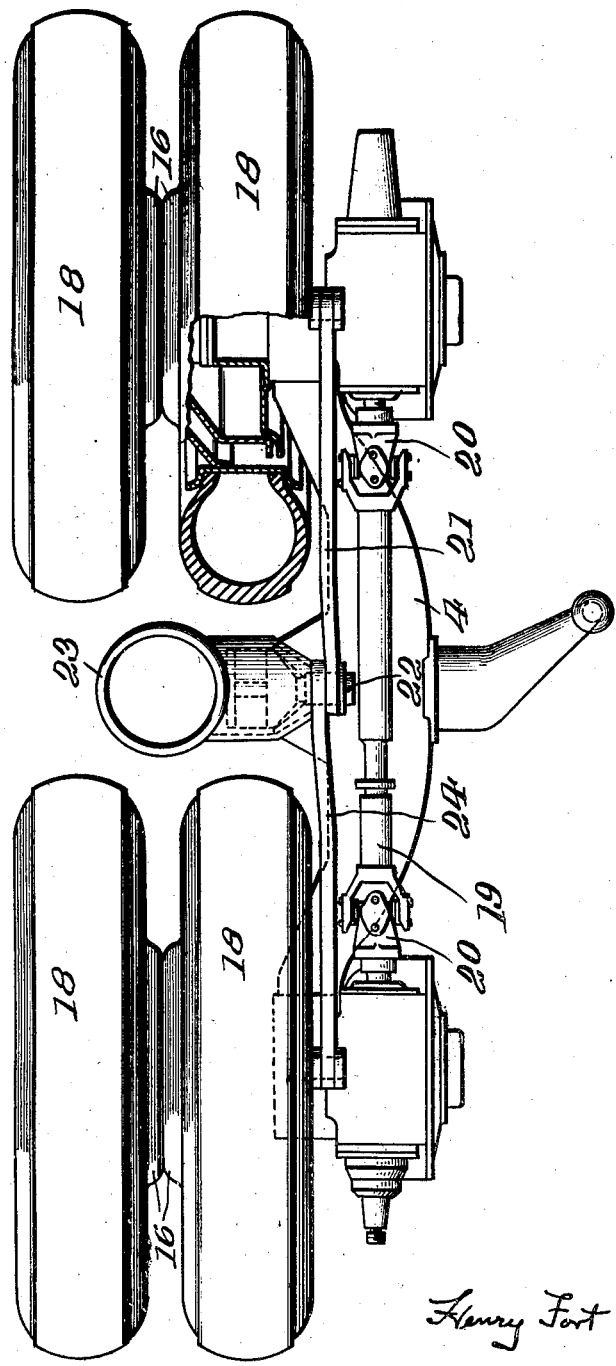
Figure 1 is a view partly in top plan and partly in section of a vehicle bogie embodying the improvements.

In the drawings, a portion of the body frame of the vehicle is shown in Fig. 2. The center beam of the body frame is indicated at 1 and the cross bolster is indicated at 2. Depending from the cross bolster is a vertically extending member 3 which supports the body frame and the body of the vehicle. There are, of course, four of these supports, and a bogie associated with each support. Only one of the bogies is illustrated in the drawings. The bogie as illustrated, includes a main frame 4 which is of one rigid boxlike construction. At each end of this bogie frame 4 is a wheel mounting. As illustrated, the bogie frame is provided with a sleeve 5 in which is mounted a spindle housing 6. Said spindle housing 6 is retained in the sleeve by a cap nut 7. Located in the spindle housing is a driving spindle 8 carrying a gear wheel 9 which meshes with a worm wheel 10 on a shaft 11. There is a cap plate 12 secured to the spindle housing. The spindle 8 is mounted in a ball bearing 13 in the cap plate 12 and in a roller bearing 14 carried by the spindle housing 6, and the hub 15 of the wheel is keyed to the spindle.

Mounted on the hub of the wheel are disks 16, 16. Each disk carries a rim 17 and each rim carries a tire 18. The wheel mountings at the opposite ends of the bogie frame are similar in construction, and the shaft 11 driving one wheel is connected to the shaft 11 driving the other wheel by an intermediate telescoping shaft 19 which is connected, respectively, to the shafts 13 by universal joints 20, 20. This driving mechanism for the wheels forms no part of the present invention, but is shown, described and claimed in my co-pending application Serial No. 91,590, filed July 20, 1936.

The spindle housing 6 is pivotally supported in the bogie frame and a link 21 connects each spindle housing with a pivot pin 22 carried by the vehicle supporting member. These links 21 which receive the re-action of the driving torque and the braking torque applied to the wheels, is also shown, described and claimed in my co-pending application.

Mounted on the vertically extending member 3, as illustrated, is a body supporting member 23. Said body supporting member 23 is provided with a rigid gimbal support 24 which projects laterally from the sleeve 23. The bogie frame 4 is mounted on this gimbal support 24 (Fig. 4). Bushings 25 and 26 are provided between the bogie frame and the gimbal support and thus it is that the bogie frame can oscillate on this gimbal support in a vertical plane. The sleeve 23 is free to turn about the vertical axis of the body supporting member 3. It is also free to move endwise thereof. Cushioning springs 27 and 28 are provided for cushioning the movements of the body frame relative to the bogie frame. The oscillating movements of the bogie frame are limited by an upwardly extending arm 29 contacting with stops 30 and 31 carried by the body supporting member.

Projecting from the gimbal support 24 is an arm 32 which is keyed to the gimbal support so that it is rigidly attached thereto. This arm carries a ball 33 to which a steering mechanism is connected and serves as a means for turning the bogie frame about the axis of the vertically extending member 3.

It will be understood that the wheel supporting member per se forms no part of the present invention, and it may be greatly modified as to details of construction. Even the driving means for the wheels may be omitted. It is essential, however, that the bogie frame shall have a support for the wheels at the opposite ends thereof, which supports project laterally from one side of the bogie frame. This provides a means whereby the wheels are disposed so that the plane of rotation of the wheels is wholly at one side of the bogie frame. The wheels may be readily removed from the bogie frame without in any way disassembling the mounting for the wheels. All that is necessary is to remove the nut holding the hub on the driving spindle and slip the wheel off and replace it with another, if desired. The manner of mounting the body may be greatly modified without departing from the spirit of the invention as set forth in the appended claims, and the steering means may also be modified, and even omitted. It is essential, however, that the body supporting member shall be wholly at one side of the bogie frame and at the same side as the wheels are located so that the vertical axis on which the bogie frame turns is substantially in the plane of rotation of the wheels. Instead of using two tires, one tire only may be used, but when two tires are used, the plane of rotation is, in effect, a plane passing between the two tires and at right angles to the axis of the wheels.

The essential features of the present invention reside in the placing of the body mounting and the wheel mounting both at the same side of the bogie frame with the vertical axis about which the bogie turns located substantially in the plane of rotation of the wheels. It is very desirable that the bogie frame shall be connected to the body supporting member so that the bogie frame may oscillate in a vertical plane, when the invention is applied to a road vehicle. It is understood that instead of a wheel having rubber tires, a wheel with flanges may be used when the invention is applied to a vehicle for use on tracks.

Having thus described the invention, what I claim as new and desire to secure by Letters Patent, is:

1. A vehicle comprising a body frame having vertically disposed members fixed thereto at each side thereof, a supporting member associated with each body frame member and mounted thereon to turn about a vertical axis and to move relative to said body frame member lengthwise thereof, cushioning means for cushioning the movements of the body frame member relative to the supporting member, a gimbal support rigidly carried by said body frame supporting member and projecting laterally therefrom, a bogie frame mounted on said gimbal support for oscillations in a vertical plane, said bogie frame having a wheel mounting at each end thereof, a wheel carried by each mounting, said wheel mountings being disposed so that the wheels rotate in a vertical plane containing the vertical axis on which the body frame supporting member turns.

2. A vehicle comprising a body frame having vertically disposed members fixed thereto at each side thereof, a sleeve associated with each body frame member and mounted thereon to turn about a vertical axis and to move relative to the body frame member lengthwise thereof, cushioning means for cushioning the movements of the body frame member relative to the supporting member, a gimbal support rigidly carried by said sleeve and projecting laterally therefrom, a bogie frame mounted intermediate its ends on said gimbal support for oscillation in a vertical plane, said bogie frame having a wheel mounting projecting laterally therefrom at each end thereof, a wheel carried by each mounting, said wheel mountings being disposed so that the wheels rotate in a vertical plane containing the vertical axis on which the body frame supporting member turns.

HENRY FORT FLOWERS.